Patented Feb. 3, 1948

2,435,206

UNITED STATES PATENT OFFICE 2,435,206

NONFOAMING COMPOSITIONS

Garland H. B. Davis, Hillside, and John C. Zimmer, Union, N. J., assignors to Standard Oil Development Company, a corporation of Delaware No Drawing. Application December 31, 1943, Serial No. 516,547

2 Claims. (Cl. 252—58)

The present invention relates to spumiferous compositions of matter containing foam depressing agents, and more particularly the invention is concerned with lubricating oils, compounded lubricants, fluid greases, and other related compositions such as hydraulic oils, shock absorber oils and the like, incorporating a small amount of anti-foaming agent.

The formation of foam is distinctly disadvantageous under many circumstances, as, for example, in engine oils for internal combustion engines, particularly the heavy duty type of oils. The heavy duty oils usually contain various metallo-organic additives such as metal phenates, phenol sulfides, carboxylates, sulfonates, alcoholates, phosphates, phosphites, thio phosphates and phosphites, borates, etc., which usually promote foaming of the oil. Engine oils may also contain organic materials such as phosphatides, esters, thickeners, etc., which may contribute to the foaming of the lubricant under certain conditions. Many internal combustion engines employ both pressure and splash system of lubrication, whereas other motors use only one of the systems. In either case the formation of foam on top of the oil during the operation of the motor leads to serious consequences due to lack of lubrication. This is particularly so in lubricating systems employing the so-called "dry sump" operation where the oil returning from the engine parts is picked up by a scavenging pump and returned to the lubricant reservoir. Since the scavenging pump normally has a capacity of several times the volume of the oil returning from the engine, a large amount of air is pumped along with the lubricant and as a result foam tends to build up in the oil reservoir to a point where some oil may be lost through the breather pipe or to a point where the pressure pump delivers foam instead of oil to the various moving parts of the engine, with a resultant lack of proper lubrication. In the case of gear lubricants, such as those designed for the lubrication of automobile rear ends and transmissions when such lubricants show a marked tendency to form foam during use, the foam entraps the lubricant to such an extent that the oil level will fall below the gear train.

Hydraulic oils and shock absorber oils likewise need protection against foaming. High pressure hydraulic systems are composed of three essential elements, an oil reservoir, a high pressure accumulator and a hydraulic cylinder. During normal operation oil is pumped from the oil reservoir to the high pressure accumulator where it is held under pressure usually by means of compressed air. The oil is then released as needed directly to the hydraulic cylinder. In the reverse operation of the hydraulic cylinder, oil is released directly into the oil reservoir. Due to the sudden release in pressure, the air which was either dissolved in or forced into the oil at the high pressure existing in the accumulator, escapes from the oil, creating a froth or foam on the surface of the oil. In those cases where this foam is of a persistent character such as to eventually interfere with the proper operation of the machine, it is necessary at certain intervals to replace the froth or foam with new oil. Troublesome foaming also occurs in the hydraulic and shock absorber equipment of airplanes when such aircraft operate at high altitudes due to the fact that the greatly reduced air pressure at higher altitudes permits the air dissolved in the oil at ground level to be released. It is therefore apparent that the presence of an anti-foaming agent in hydraulic media would serve a useful purpose.

The principal object of the present invention is to provide lubricating compositions and pressure transfer media which will not froth or foam during use. This and other objects will be apparent to those skilled in the art upon reading the following description.

It has now been found that certain highly fluorinated organic compounds, that is organic compounds of the aliphatic type in which the major proportion of the hydrogen has been replaced with fluorine, will, when present in small amounts materially depress foaming in compositions of matter such as lubricating oil (both compounded and uncompounded), turbine oils, industrial lubricants, process oils, engine oils, hydraulic fluids, shock absorber oils, cutting oils, saturating compositions, asphaltic oils, gear lubricants and various other related compositions, as well as oil concentrates containing from 0.5 to 50% of additives. The fluorinated hydrocarbons may be added to the oleaginous compositions at any stages of their manufacture or may be incorporated with one or more of the additives prior to the addition of the additive or mixture of additives to the oily material, as for instance the fluorinated hydrocarbon may be included with the metal soaps of the petroleum oil sulfonic acids, such as the calcium soaps; the metal soaps of organic thiophosphoric acid, such as the zinc soaps; metal phenates, metal alkylated phenates, metal phenol sulfides, metal alkylated phenol sulfides, like metal tertiary octyl phenol sulfide, and metal alkylated phenol sulfides reacted with $P_2S_5$, where the metal is a polyvalent metal such as barium; and the like. The fluorinated compounds may also contain other halogens, oxygen, nitrogen, phosphorus, sulfur, or metal salts of acid radicals in the molecule.

The highly fluorinated compounds contemplated within the scope of the present invention are known, methods for their production having been described by both Bochemuller and Simmons. For the purpose of the present invention it is preferred to use those highly fluorinated compounds which have boiling points above 85° C. at atmospheric pressure and viscosity between 30 and 2000 S. U. S. at 210° F. This range includes those highly fluorinated compounds having from 5–50 carbon atoms to the molecule, such as heptafluoropentane ($C_5H_5F_7$), octafluoropentane ($C_5H_3F_8$), dodecafluoropentane ($C_5F_{12}$), and similar derivatives of such hydrocarbons as pentadecane and eicosane. These fluorinated hydrocarbons will contain from about 60 to about 80% fluorine, from about 20 to about 37% carbon and from zero to about 3% hydrogen. It is preferred to use fluorinated compounds in which substantially all of the hydrogen has been replaced by fluorine.

In the practice of the present invention for suppressing foam in compositions such as lubricants, hydraulic media and the like, the fluoro-organic compound is added to such compositions in an amount from .0001–10% by weight. The fluoro-organic compounds are substantially insoluble in such fluids and although having a greater specific gravity than many common fluids, it is believed that the fluorine compounds possess the characteristics of concentrating at the interface between the liquid phase and the gaseous foam phase, thereby breaking or destroying any foam bubbles present or as formed.

Many methods might be devised for showing the inherent characteristics of an oleaginous material to form foam and such methods could, with equal facility, be employed to compare the foam-depressing properties of various anti-foaming agents. One particularly informative method is to agitate the material by partially immersing in it a mechanical mixer rotating at the rate of about 1000 R. P. M. for 10 minutes, the material being held at a temperature of 100° F. The percentage volume change of the material due to dispersion of air into it is then taken as a measure of the foaming tendency of the material. Compounds possessing potent defoaming action hold the percentage increase in volume to less than 10% and the preferred defoamers restrict the percentage volume change to 6% or less.

Another acceptable method of indicating the foaming characteristics of a material or to compare the action of defoamers is by bubbling air through a dispersing device into the material maintained at a uniform temperature, at a fixed rate of air flow and for a fixed time interval. In this test the volume of foam formed can be used directly for comparing the foaming characteristics of the material under test. Further helpful information can at times be obtained by running this test at different fixed temperatures.

The following examples are given merely for the purpose of illustrating the principles of the present invention.

*Example 1*

600 grams of a commercial S. A. E. 30 heavy duty mineral lubricating oil (containing detergent-type additives) were heated to 100° F. and agitated for 10 minutes with a beater rotating at the rate of 1000 R. P. M. The volume of the oil increased 22% as a result of the high speed agitation. The volume change of the oil due to dispersion of air into the oil was taken as a measure of the foaming tendency of the oil. Various highly fluorinated hydrocarbons were then tested for defoaming characteristics with the following result:

Percent Volume Increase

SAE 30 Heavy duty motor oil _____ 22
SAE 30 Heavy duty motor oil+0.1% [1] _____ 9
SAE 30 Heavy duty motor oil+0.1% [2] _____ 0
SAE 30 Heavy duty motor oil+0.01% [2] _____ 2
SAE 30 Heavy duty motor oil+0.1% [3] _____ 0
SAE 30 Heavy duty motor oil+0.01% [3] _____ 0
SAE 30 Heavy duty motor oil+0.1% [4] _____ 6

[1] A highly fluorinated aliphatic hydrocarbon containing 26.30% carbon, .09% hydrogen, and 71.30% of fluorine and having a viscosity of 67 S. U. S. at 210° F.
[2] A highly fluorinated aliphatic hydrocarbon containing 24.24% carbon, 0.12% hydrogen, 67.03% fluorine.
[3] A highly fluorinated aliphatic hydrocarbon containing 24.25% carbon, 0.05% hydrogen, 73.59% fluorine.
[4] A highly fluorinated aliphatic hydrocarbon containing 24.66% carbon, 0.18% hydrogen, 68.07% fluorine.

It will be seen that the fluorinated hydrocarbon compounds of the present invention were highly effective in reducing the foaming tendencies of the heavy duty lubricant.

*Example 2*

1000 cc. of SAE 30 heavy duty compounded mineral lubricating oil were heated to 110° F. and then placed in a 5 liter graduated cylinder having an air thimble in the bottom. Air was then blown through the oil, maintained at the temperature of 110° F., for 10 minutes at the rate of 290 cc./minute. At the end of 10 minutes 2850 cc. of foam had formed. Another 1 liter sample of SAE 30 heavy duty motor oil was heated to 150° F. and air likewise blown through by means of the air thimble, for 10 minutes at the given rate of 290 cc./minute. At the end of 10 minutes, 2030 cc. of foam had formed. The tests were then repeated using various defoamers with the oil in an amount equivalent to .01% by weight, with the following results:

|  | cc. of Foam Formed in 10 Minutes | |
| --- | --- | --- |
|  | 110° F. | 150° F. |
| SAE 30 Heavy duty oil | 2,850 | 2,030 |
| SAE 30 Heavy duty oil +.01% [1] | 108 | 450 |

[1] A highly fluorinated organic compound containing about 68% fluroine.

What is claimed is:

1. A composition of matter consisting essentially of a mineral lubricating oil containing metallo-organic additives which tend to cause excessive foaming of said oil upon heating and/or working, and .0001 to 10% by weight of a substantially oil-insoluble anti-foaming agent selected from the highly fluorinated aliphatic hydrocarbons having 5 to 50 carbon atoms and composed of 60 to 80% fluorine by weight, 20 to 37% carbon, and 0 to 3% hydrogen.

2. As a composition of matter, a mineral lubricating oil, and 10% barium tertiary octyl phenol sulfide mixed with .01% by weight of a highly fluorinated aliphatic hydrocarbon containing about 24% carbon, about .05% hydrogen and about 73.59% fluorine the fluorinated hydrocarbon being substantially insoluble in the lubricating oil.

GARLAND H. B. DAVIS.
JOHN C. ZIMMER.

REFERENCES CITED

The following references are of record in the file of this patent:

UNITED STATES PATENTS

| Number | Name | Date |
|---|---|---|
| 2,362,291 | Winning | Nov. 7, 1940 |
| 2,186,917 | Gaylor | Jan. 9, 1940 |
| 2,186,916 | Gaylor | Jan. 9, 1940 |
| 2,370,787 | Gaylor | Mar. 6, 1945 |
| 2,318,684 | Gaylor | May 11, 1943 |
| 2,291,166 | Maag | July 28, 1942 |
| 2,063,880 | Lincoln | Dec. 8, 1936 |
| 2,291,166 | Wilson | Apr. 28, 1942 |